United States Patent [19]
Berger

[11] Patent Number: 4,833,539
[45] Date of Patent: May 23, 1989

[54] CIRCUIT FOR READING A LINE-TRANSFER PHOTOSENSITIVE DEVICE, A LINE-TRANSFER PHOTOSENSITIVE DEVICE INCORPORATING SAID CIRCUIT AND A METHOD FOR READING SAID DEVICE

[75] Inventor: Jean L. Berger, Grenoble, France

[73] Assignee: Thomson-CSF, Paris, France

[21] Appl. No.: 133,422

[22] Filed: Dec. 15, 1987

[30] Foreign Application Priority Data

Dec. 16, 1986 [FR] France .................. 86 17571

[51] Int. Cl.[4] .............................. H04N 3/15
[52] U.S. Cl. ................... 358/213.31; 358/213.26; 358/213.29
[58] Field of Search ............ 358/213.26, 213.29, 358/213.31; 357/246 R

[56] References Cited

U.S. PATENT DOCUMENTS

| | | | |
|---|---|---|---|
| 4,598,320 | 7/1986 | Arques | 358/213.31 |
| 4,611,234 | 9/1986 | Berger et al. | 358/213.31 |
| 4,682,236 | 7/1987 | Wang et al. | 358/213.26 |
| 4,684,993 | 8/1987 | Berger et al. | 358/213.29 |

FOREIGN PATENT DOCUMENTS

0141695 5/1985 European Pat. Off. .

OTHER PUBLICATIONS

IBM Technical Disclosure Bulletin, vol. 13, No. 12, May 1971, pp. 3734-3735, New York, U.S.; L. G. Heller: "Bucket-Brigade Delay Line with Loss Compensation".

Primary Examiner—Jin F. Ng
Assistant Examiner—Stephen Brinich
Attorney, Agent, or Firm—Oblon, Fisher, Spivak, McClelland & Maier

[57] ABSTRACT

When the capacitance of the conductive columns of the line-transfer photosensitive device is higher than that of the photosensitive elements and of the read register, use is made of a reading circuit provided in the case of each conductive column with a plurality of charge storage capacitors separated by an MOS transistor. These MOS transistors operate in the saturating mode and pass signal charges derived from each conductive column from one capacitor to the next up to the read register. The storage capacitors have decreasing values as the distance from the read register becomes shorter. Transfer of the signal charges is accompanied by transfer of polarization charge quantities which decrease in value as the distance from the register becomes shorter. Once the transfer operations have been performed, these quantities of polarization charges are returned to their initial capacitors.

11 Claims, 7 Drawing Sheets

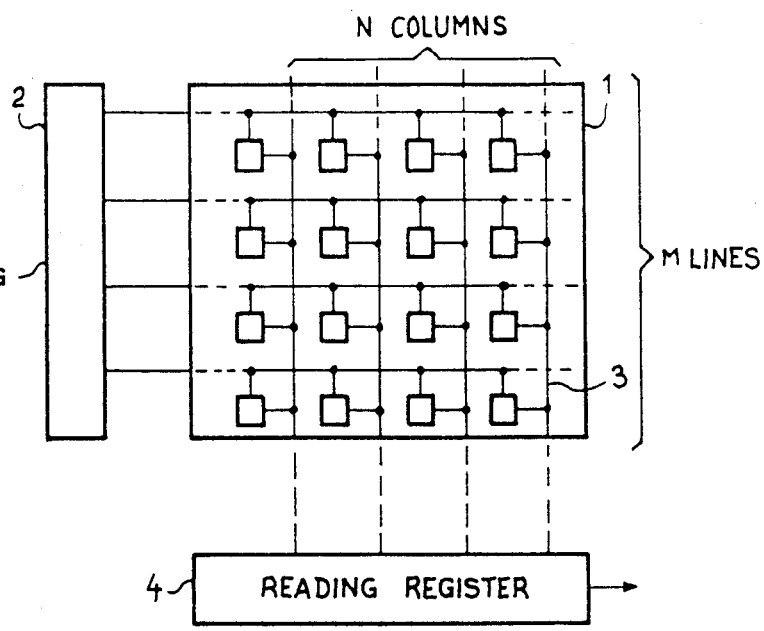
FIG_1
PRIOR ART
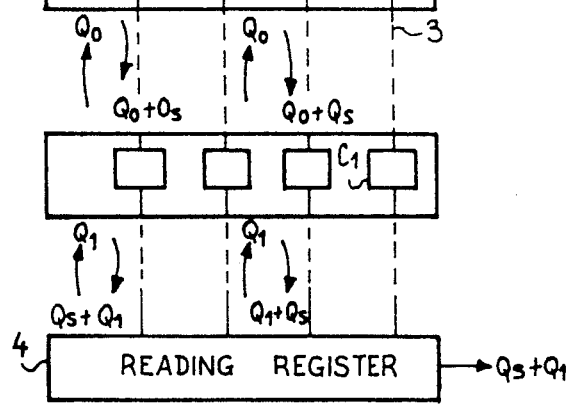
FIG_2
PRIOR ART

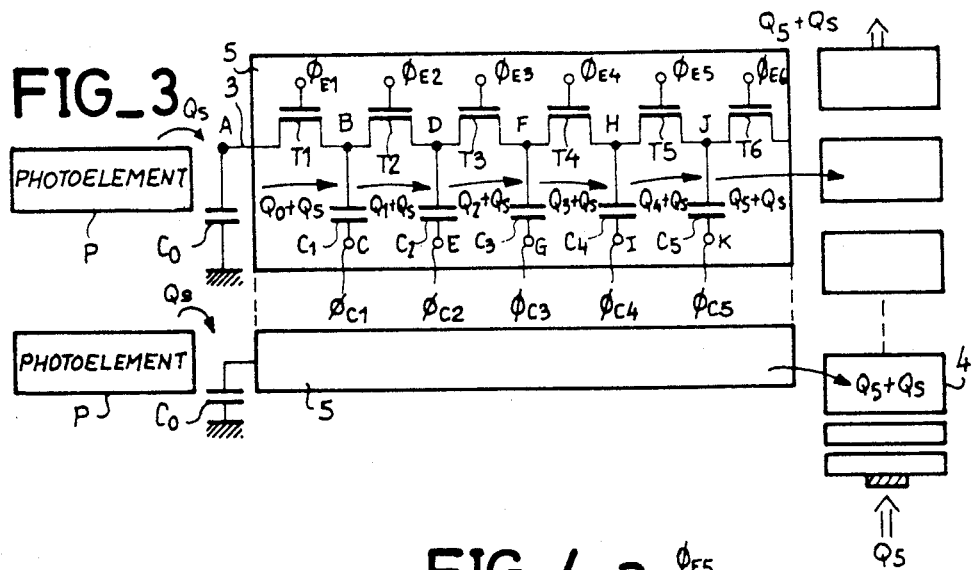
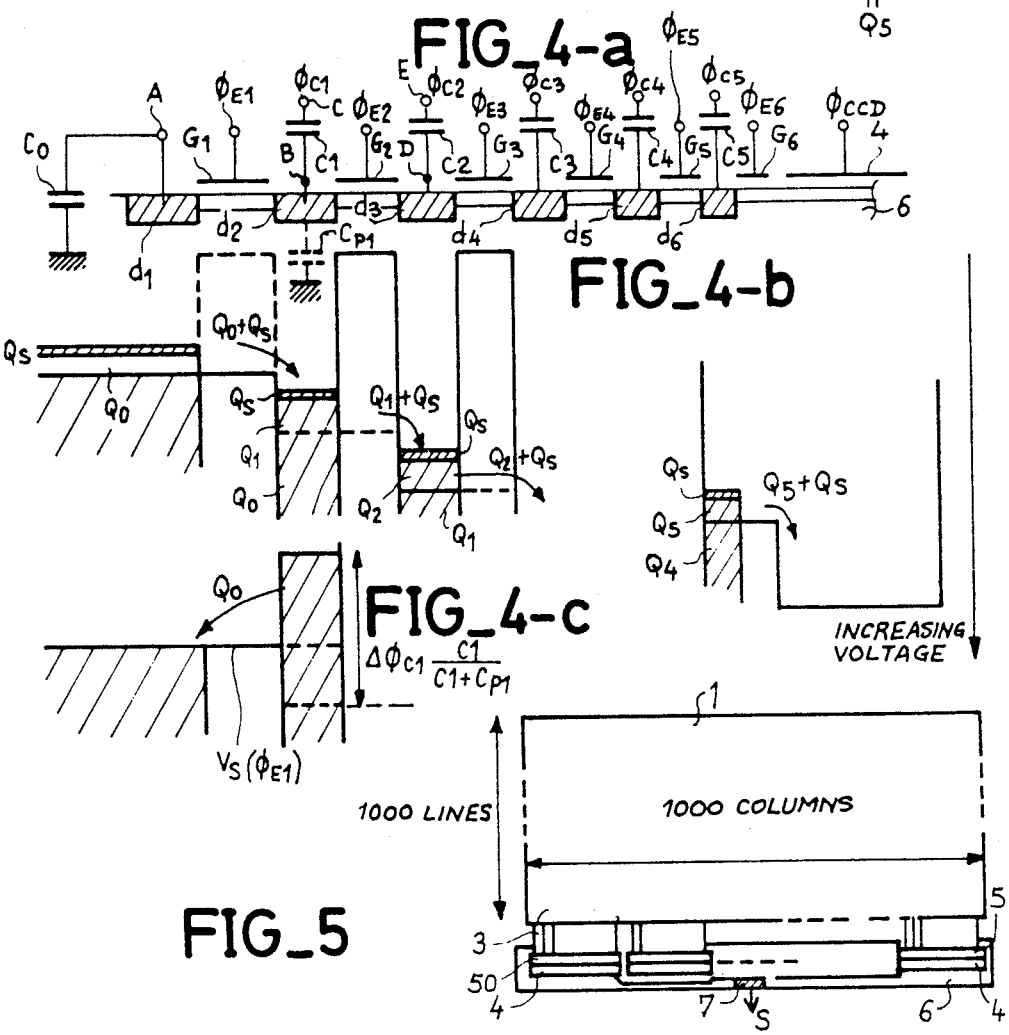

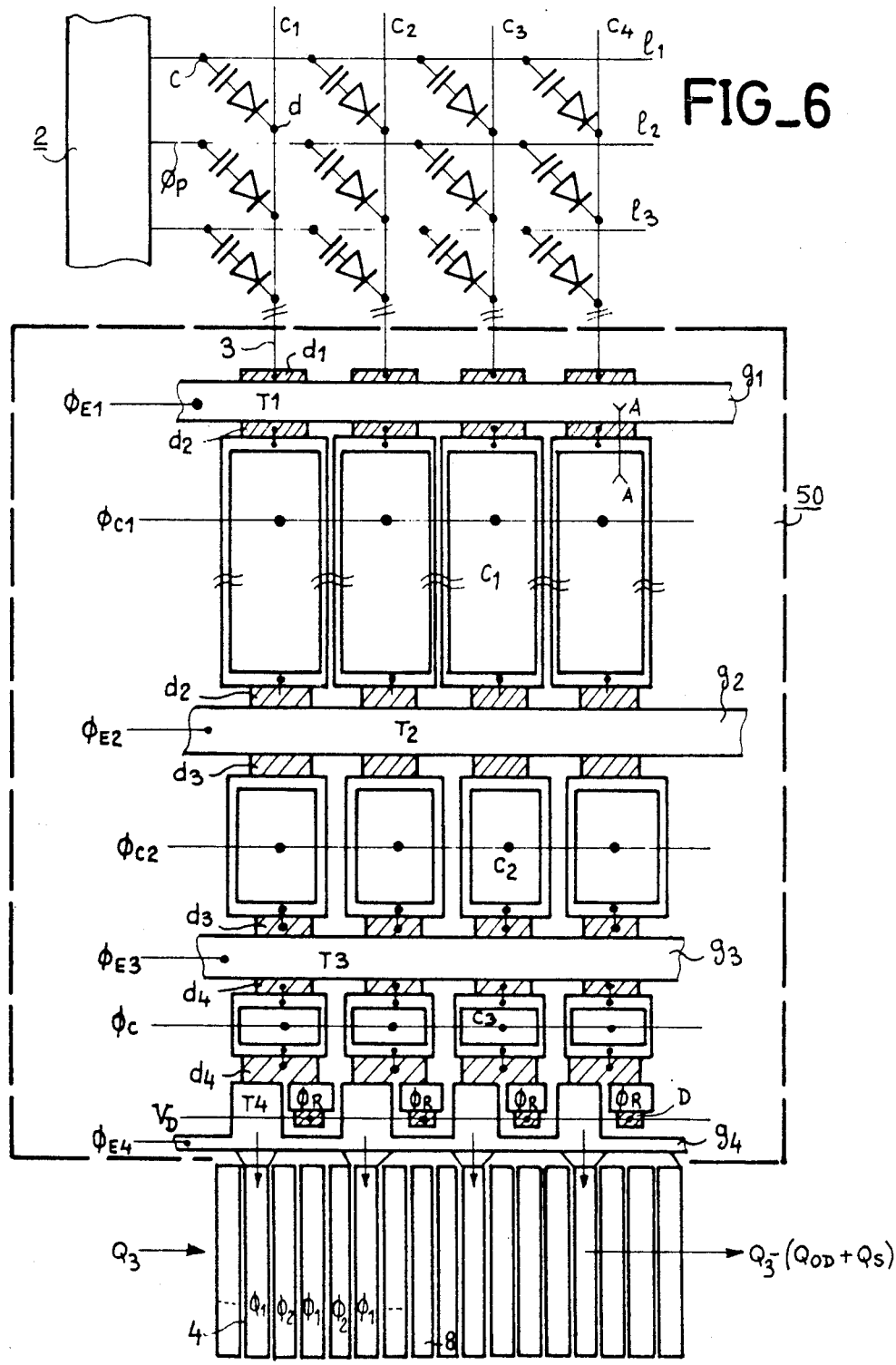
FIG_6

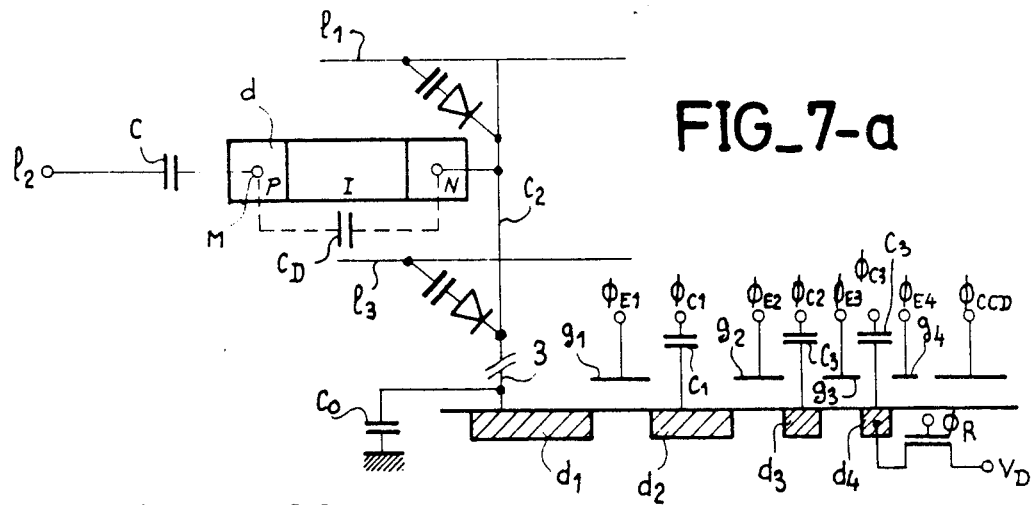
FIG_7-a
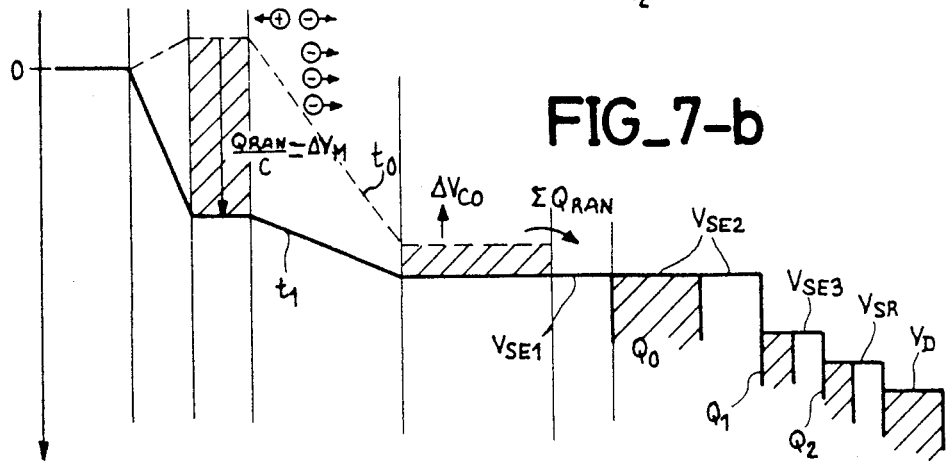
FIG_7-b
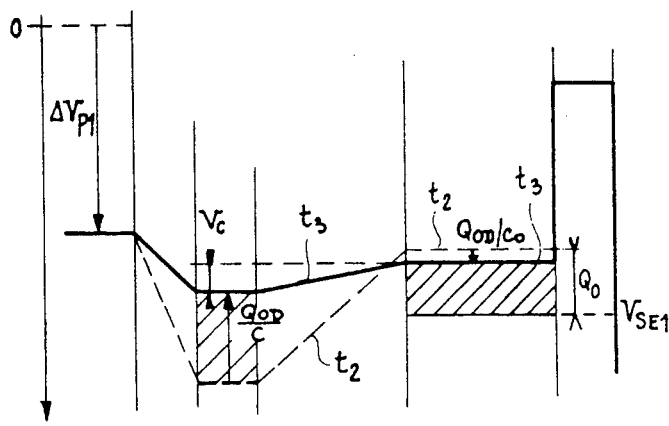
FIG_7-c

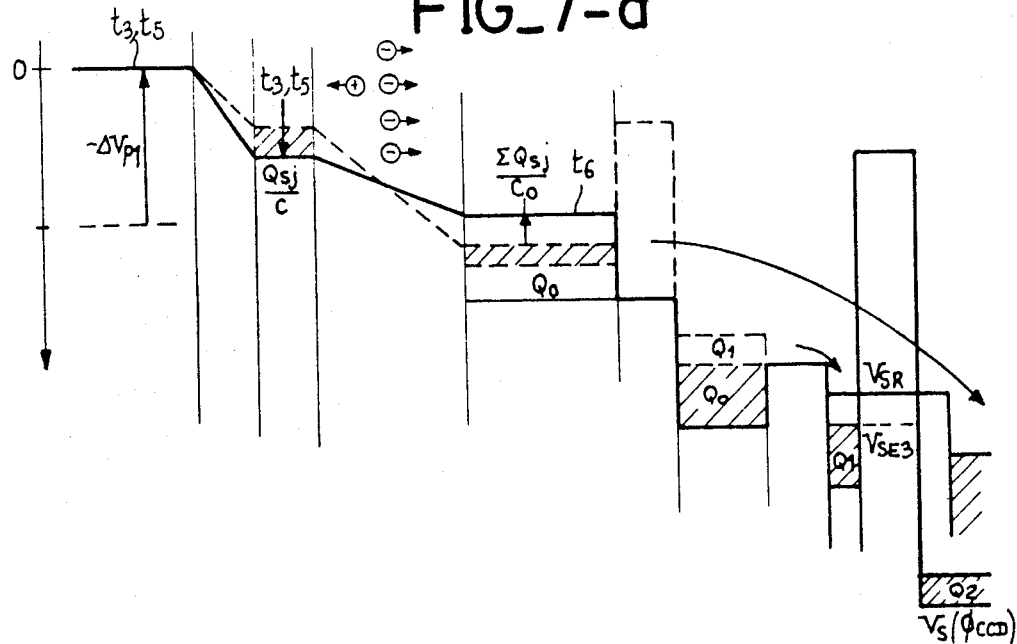
FIG_7-d
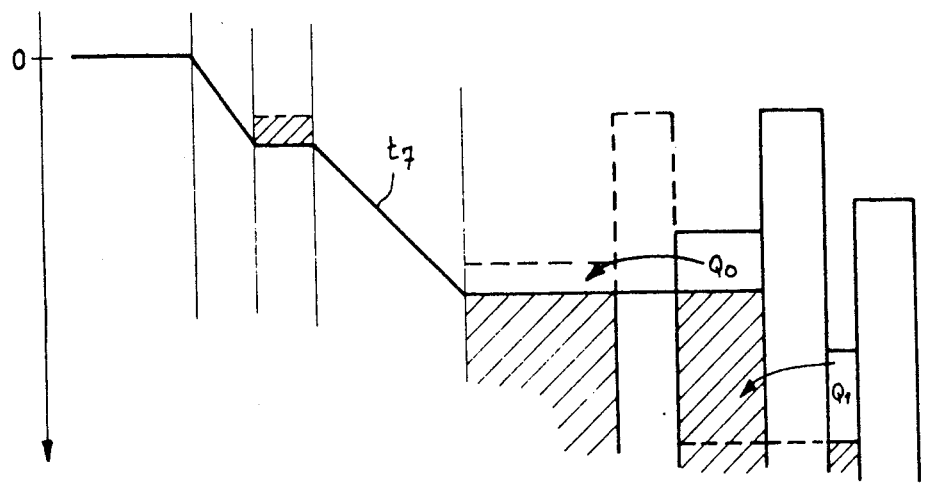
FIG_7-e

FIG_7-f
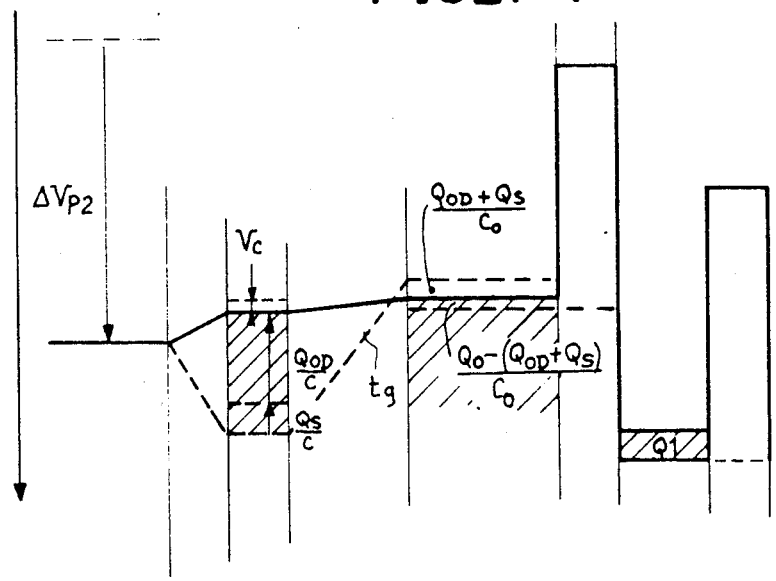
FIG_7-g
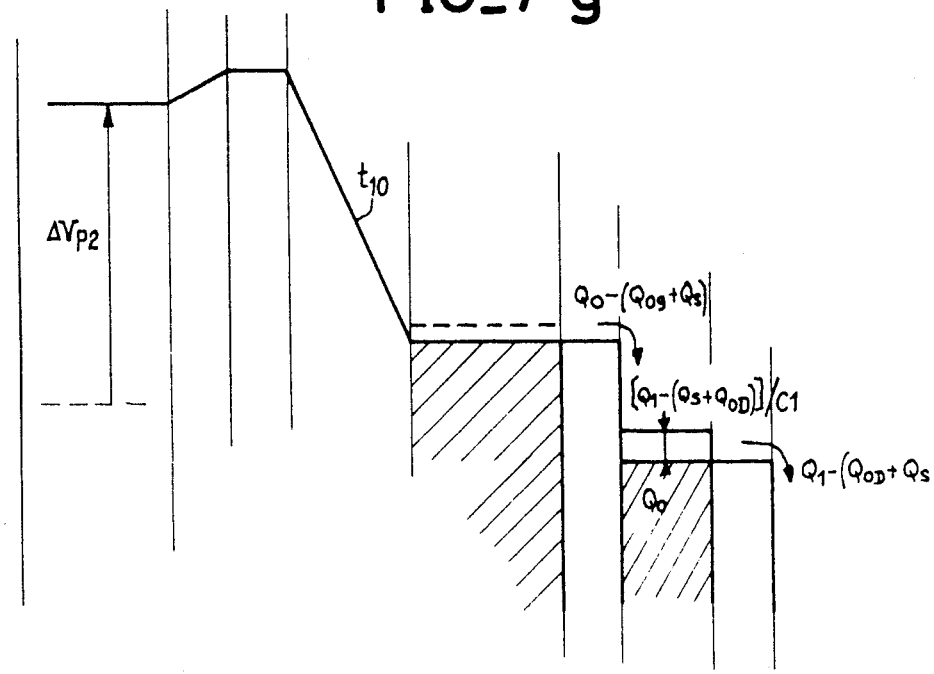

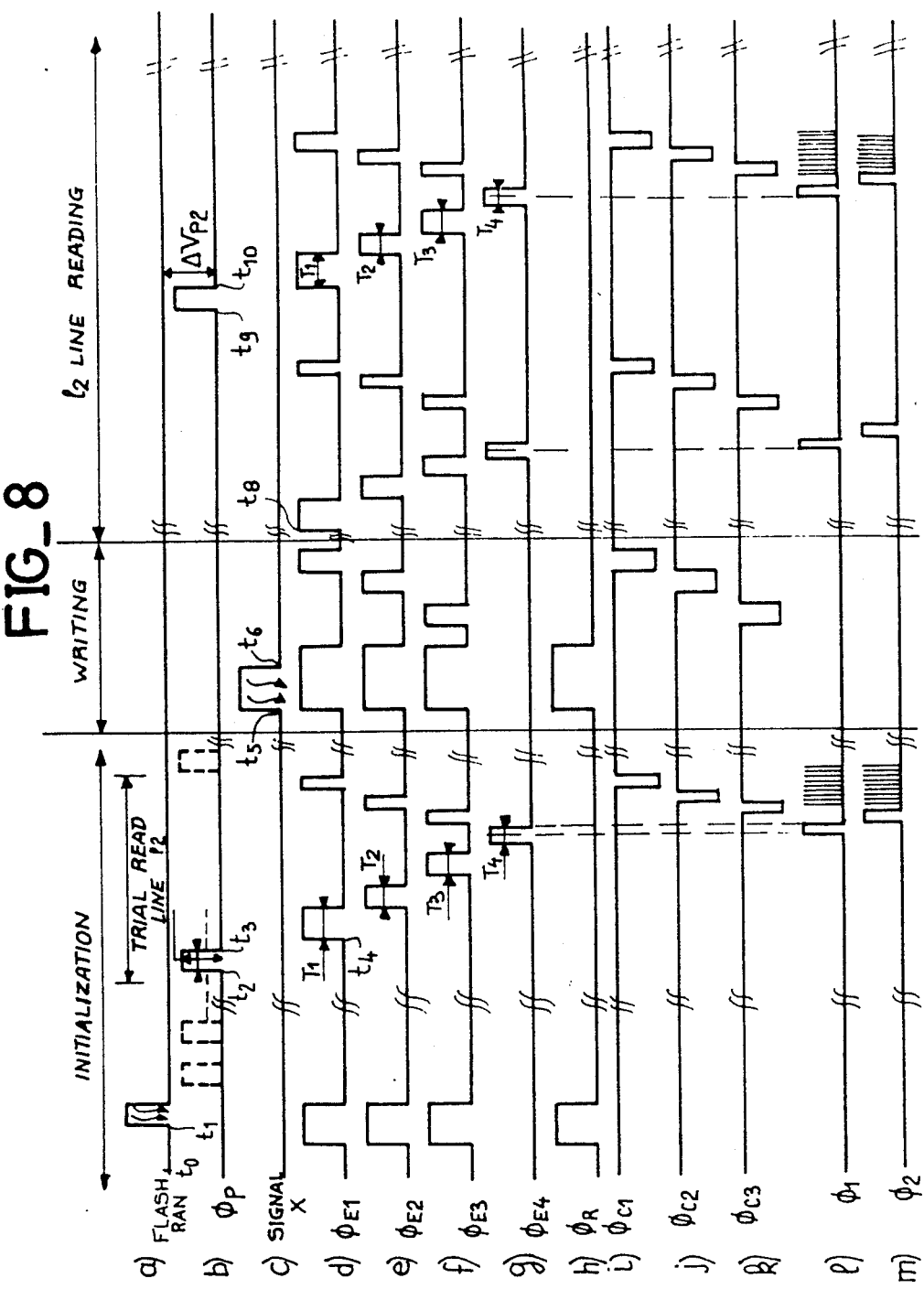

CIRCUIT FOR READING A LINE-TRANSFER PHOTOSENSITIVE DEVICE, A LINE-TRANSFER PHOTOSENSITIVE DEVICE INCORPORATING SAID CIRCUIT AND A METHOD FOR READING SAID DEVICE

BACKGROUND OF THE INVENTION

1. Field of the Invention

The present invention relates to a circuit for reading a line-transfer photosensitive device. The invention is also concerned with a line-transfer photosensitive device incorporating said reading circuit and with a method for reading said device.

2. Description of the Prior Art

Row-transfer or so-called line-transfer photosensitive devices are well-known in the prior art. It is recalled that a device of this type as represented schematically in FIG. 1 of the accompanying drawings usually has a photosensitive zone 1 consisting of a matrix array of M "lines" or rows each composed of N photosensitive elements P. This zone receives the image to be scanned and converts it to electric charges or so-called signal charges $Q_s$. The photosensitive elements of one and the same row are connected to each other as well as to an address register 2 which serves to select one row of the matrix. The photosensitive elements of any one column are connected to the same conductive column 3. When one row of the matrix is selected by the address register, the signal charges created within each of the photosensitive elements of this row are transferred via conductive columns 3 to a charge-coupled read register 4 having parallel inputs and a series output.

European patent Application No. 0,078,038 filed in the name of Matsushita and French patent No. 2,538,200 granted to Thomson-CSF relate to line-transfer photosensitive devices.

In these two patents, efficiency of charge transfer is enhanced by superimposing a quantity $Q_o$ of a so-called drive or polarization charge at the time of transfer of each signal charge quantity $Q_s$ from a conductive column 3 to a capacitor $C_1$, then by superimposing a quantity $Q_1$ of drive or polarization charge at the time of transfer of each signal charge quantity $Q_s$ from a capacitor $C_1$ to the read register.

It is known that, when charges are transferred by skimming above a potential barrier from a source capacitor to a drain capacitor, it is necessary to superimpose on the signal to be transferred a constant polarization charge which maintains efficiency of transfer at an acceptable level irrespective of the amplitude of the signal to be transferred.

The different transfers considered in the foregoing are illustrated in FIG. 2. These transfers constitute only part of the transfers described in the cited patent to Thomson-CSF in which transfer of parasitic charges is also carried out with polarization charges.

When carrying out transfers from the capacitors $C_1$ to the read register, the drive-charge quantities $Q_o$ are retained in the capacitors $C_1$ and charge quantities equal to $Q_1 + Q_s$ are transmitted into the register. Charge quantities equal to $Q_1 + Q_s$ are therefore read at the output of the register.

After each signal charge transfer $Q_s$, polarization charges $Q_o$ and $Q_1$ are returned respectively from the capacitors $C_1$ to the columns and from the read register to the capacitors $C_1$ as illustrated in FIG. 2.

The problem which arises is that the structures proposed in the prior art can no longer be used when the conductive columns have a high capacitance of the order of one nanofarad as is the case in current applications which will be considered in detail hereinafter.

The object of the description which now follows will be to show the limits of structures proposed in the prior art in regard to the maximum permissible value of capacitance of the conductive columns.

The capacitance of a charge-coupled register is such that the quantity of drive or polarization charge $Q_1$ employed cannot exceed a few picocoulombs without resulting in a register 4 having unacceptable surface areas. The register must in fact be capable of transporting the drive charge $Q_1$ as well as a signal charge $Q_s$ having a maximum value of a few picocoulombs. By way of example, the following limit will be adopted in regard to the value of $Q_1$:

$$Q_1 \leq 1 \text{ pC} \qquad (1)$$

Moreover, as disclosed in the cited patent to Thomson, for example, it is known that a quantity of drive charge $Q_i$ must have a sufficient value to change-over to high inversion at the commencement of transfer of charges produced by a capacitor $C_i$. This condition is represented by the following formula:

$$\frac{Q_i}{C_i} \geq \phi_F = \frac{kT}{q} \cdot \text{Ln} \frac{N_D}{n_i} \qquad (1')$$

where:

$\phi_F$ gives the position of the Fermi level,
k is the Boltzmann constant,
T is the temperature
q is the charge of the electron,
$N_D$ is the dopant concentration of the substrate,
$n_i$ is the intrinsic concentration.

There are chosen for $N_D$ and $n_i$ the following mean values: $N_D = 10^{16}/\text{cm}^3$ and $n_i = 10^{10}$ cm$^3$, which gives the following condition in regard to the values of $Q_1$ and $C_1$:

$$\frac{Q_1}{C_1} \geq 0.360 \text{ V} \qquad (2)$$

Taking into account relation (1), the following condition is obtained in regard to the value of the capacitor $C_1$:

$$C_1 \leq \frac{1 \text{ pC}}{0.360 \text{ V}} = 2.8 \text{ pF} \qquad (3)$$

Moreover, the capacitor $C_1$ must be capable of storing the charge quantities $Q_o$ with a voltage swing $\Delta V$ which is compatible with the voltage sources usually employed in semiconductors. Since this voltage swing $\Delta V$ is of the order of a few volts, the following condition may be established:

$$\Delta V \leq 10 \text{ V} \qquad (4)$$

and the maximum polarization-charge quantity $Q_o$ which can be stored in each capacitor $C_1$ is written as follows, taking into account relations (3) and (4):

$$Q_o \leq 2.8 \text{ pF} \cdot 10 \text{ V} = 28 \text{ pC} \qquad (5)$$

The application of the condition stated earlier in regard to high-inversion transfer:

$$\frac{Q_i}{C_i} \geq \phi_F, \text{ whence } \frac{Q_o}{C_o} \geq \phi_F = 0.360 \text{ V}$$

serves to determine the maximum permissible value of capacitance in the case of the capacitors $C_o$ of the conductive columns 3:

$$C_o \leq \frac{28 \, pC}{0.360 \text{ V}} = 78 \, pF \qquad (6)$$

Relation (6) shows that the structures proposed in the prior art do not permit satisfactory operation when the capacitor $C_o$ of the conductive columns 3 has a value greater than about ten picofarads.

This can be verified by computing the polarization charge $Q_o$ which is made necessary when employing conductive columns 3 having a capacitance $C_o$ of the order of 1000 pF.

The application of the condition stated in the foregoing in regard to high-inversion transfer:

$$\frac{Q_i}{C_i} \geq \phi_F \qquad (1')$$

$$\text{whence } \frac{Q_o}{C_o} \geq 0.360 \text{ V} \qquad (2)$$

produces the following condition:

$$Q_o \geq 360 \, pC \qquad (7)$$

Moreover, in the article entitled "Line-transfer image sensor operating in the double-reading mode" by J. L. Berger, L. Brissot and Y. Cazaux of Thomson-CSF and published on Aug. 8th, 1985 in IEEE Transactions on Electron Devices, vol. ED 32, No. 8, there is defined on page 1517 in relation (6) an expression of transfer inefficiency which makes it possible to calculate the value of the drive-charge quantity employed for carrying out this transfer.

Inefficiency of transfer $\epsilon_o$ from the capacitor $C_o$ of the columns to a capacitor $C_1$ is written as follows when a term of the second order $\epsilon_F$ is disregarded:

$$\epsilon_o = C_o^3 \cdot \frac{2kT/q}{\beta \, Q_o^2} \cdot \frac{1}{T_1} \qquad (8)$$

where $T_1$ is the transfer time-duration and characterizes the channel in which the transfer takes place.

The expression of $Q_o$ is accordingly as follows:

$$Q_o = \sqrt{\frac{2 \, C_o^3 kT}{\epsilon_o q \beta} \cdot \frac{1}{T_1}} \qquad (9)$$

We obtain in respect of $Q_o$ the following value:

$$Q_o = 1000 \, pC \qquad (10)$$

by adopting the following common values:

$$\epsilon_o \leq 1\%, \beta = 10^{-4} A/V^2, \frac{kT}{q} = 26 \text{ mV}$$

The value obtained in the case of $Q_o$ (10) is entirely disproportionate in view of relation (5), $Q_o \leq 28$ pC, which was obtained in the course of previous calculations.

The present Applicant has therefore shown that the structures proposed in the prior art are unusable when the capacitor $C_o$ of the conductive columns has a high value with respect to the storage capacitance of the photosensitive element and of the read register. For example, when said capacitor $C_o$ has a value of the order of 1 nF, the capacitance of the photosensitive elements and of the register is accordingly of the order of 1 pF.

It must be understood that the structures of the prior art are suitable for use when the capacitance of the photosensitive elements, of the conductive columns and of the charge-coupled register is of the order of a few picofarads.

SUMMARY OF THE INVENTION

The present invention provides a solution to the problem stated in the foregoing and is accordingly concerned with a novel structure of a reading circuit for a line-transfer photosensitive device which makes it possible to take into account the high value of capacitance of the conductive columns. This reading circuit permits efficient transfer of the signal charges with minimum noise from the photosensitive elements to the charge-coupled read register which provides a series output for video information.

This invention relates to a reading circuit for a line-transfer photosensitive device in which a photosensitive zone is made up of photosensitive elements arranged in rows and columns, the photosensitive elements of any one column being connected to a conductive column which terminates at the reading circuit. Said reading circuit includes at least one charge-coupled shift register, the capacitance of the conductive columns being of high value with respect to the capacitance of the photosensitive elements and of the register. The distinctive feature of the invention lies in the fact that the reading circuit is provided in the case of each conductive column with a plurality of charge storage capacitors separated by an MOS transistor which operates in the saturating mode and ensures transfer of the signal charges produced by each conductive column from one capacitor to the next up to the read register, the storage capacitors being of decreasing value as the distance from the read register decreases. The reading circuit is essentially provided in addition with means for generating quantities of polarization charges which accompany the transfer of signal charges produced by a conductive column to a storage capacitor and then their transfer from one storage capacitor to the next up to the register, the quantities of polarization charges being of decreasing value as the distance from the read register decreases. In accordance with another distinctive feature, the reading circuit is also provided with means for returning the quantities of polarization charges from a storage capacitor or from the register to the preceding capacitor.

The present invention also relates to a line-transfer photosensitive device provided with a reading circuit of this type and to a method for reading a device of this type.

BRIEF DESCRIPTION OF THE DRAWINGS

FIGS. 1 and 2 are diagrams of line-transfer photosensitive devices in accordance with the prior art.

FIG. 3 is a diagram showing part of one embodiment of a reading circuit in accordance with the invention.

FIGS. 4a, 4b and 4c are respectively a cross-sectional view of the reading circuit of FIG. 3 and diagrams which serve to explain the operation of said circuit.

FIG. 5 is a diagram illustrating a line-transfer photosensitive device in which the reading circuits in accordance with the invention are employed.

FIG. 6 is a top view showing part of the device of FIG. 5.

FIGS. 7a to 7g are respectively a cross-sectional view of a portion of the device of FIG. 5 and diagrams which serve to explain the operation of said device.

FIGS. 8a to 8m are time-waveform diagrams of the control signals employed in the device of FIG. 6.

In the different figures, the same references designate the same elements but it will be understood that the dimensions and proportions of various elements have not been observed.

DESCRIPTION OF THE PREFERRED EMBODIMENTS

FIGS. 1 and 2 have already been described in the introductory part of the specification.

In FIG. 3, a portion of one embodiment of a reading circuit in accordance with the invention is illustrated schematically.

This reading circuit terminates in a charge-coupled read register 4. To each stage of this register is connected a circuit 5 of the type shown in FIG. 3. In the example shown in this figure, the circuit is constituted by a series of five capacitors $C_1$ to $C_5$ and six MOS transistors $T_1$ to $T_5$. Said circuit is connected to a conductive column 3 of a line-transfer photosensitive device such as those of FIGS. 1 and 2. This column 3 is represented in FIG. 3 by its capacitor $C_o$ into which is delivered a signal charge quantity $Q_s$ obtained from a photosensitive element P. A circuit 5 is connected at its input to each conductive column 3 of the line-transfer photosensitive device and at its output to one of the stages of the read register 4. On account of limited available space, FIG. 3 shows only two circuits 5 whose outputs are connected to the read register 4 and only one of these circuits 5 is shown in detail.

It is apparent from FIG. 3 that the circuit 5 is constituted by an MOS transistor $T_1$ connected to one of the terminals of the capacitor $C_o$, the other terminal of which is connected to ground and to one of the terminals B of a capacitor $C_1$. The gate of the MOS transistor $T_1$ receives a control signal $\phi_{E1}$ and the other terminal C of the capacitor $C_1$ receives a control signal $\phi_{C1}$. To the terminal B is connected an MOS transistor $T_2$ which receives the control signal $\phi_{E2}$ on its gate and which is also connected to a terminal D of a capacitor $C_2$, the other terminal E of which receives a control signal $\phi_{C2}$.

Four other transistors $T_3$, $T_4$, $T_5$, $T_6$ and four other capacitors $C_2$, $C_3$, $C_4$, $C_5$ are connected in the same manner as the transistors $T_1$, $T_2$ and the capacitors $C_1$, $C_2$. The output of the last transistor $T_6$ is connected to one stage of the read register 4.

FIG. 4a is a view in cross-section through one of the circuits 5 of FIG. 3. In accordance with customary practice, each MOS transistor is represented by two diodes separated by a gate. Thus the MOS transistor $T_1$ is constituted by the two diodes $d_1$ and $d_2$ separated by the gate $G_1$ which receives the signal $\phi_{E1}$. The MOS transistor $T_2$ is constituted by the two diodes $d_2$ and $d_3$ separated by the gate $G_2$ which receives the signal $\phi_{E2}$ and so on in sequence. The capacitor $C_1$ which receives the signal $\phi_{C1}$ on its terminal C has a terminal B connected to the diode $d_2$. Likewise the capacitor $C_2$ receives the signal $\phi_{E2}$ on its terminal E and has a terminal D connected to the capacitor $C_3$. The characteristics of the MOS transistors and the control signals received by these latter are such that they operate in the saturating mode. The reading circuit in accordance with the invention utilizes the well-known method of charge transfer by skimming above a potential barrier.

FIGS. 4b and 4c show the progressive variation of potentials within the semiconductor substrate 6 in which the circuit 5 of FIG. 3 is formed. The rising potentials are directed downwards.

The invention relates to reading circuits for line-transfer photosensitive devices in which the capacitor $C_o$ of the conductive columns 3 has a very high value in comparison with the capacitance of the detectors and of the read register. In consequence, FIG. 4b shows a charge quantity $Q_S$ of small amplitude which is transferred to the high-value capacitor $C_o$ of a conductive column 3.

As has been shown earlier, it is necessary to superimpose on $Q_s$ a polarization charge quantity $Q_o$ which satisfies relation (1') and which is given by relation (9') as a function of the useful parameters of the circuit in order to carry out transfer to the capacitor $C_1$ when the signal $\phi_{E1}$ applied to the gate $G_1$ is at a high level and permits this transfer. The other gates of the circuits receive control signals at the low level. The capacitor $C_1$ also receives a clock signal $\phi_{C1}$ at the high level. Since transistor $T_1$ operates in the saturating mode, the floating potential of the diode $d_1$ is aligned with the potential established by the gate $G_1$: this corresponds to transfer to the capacitor $C_1$ of a quantity of charge equal to $Q_o + Q_s$ as illustrated in full lines on the left of FIG. 4b.

The value chosen for the capacitor $C_1$ is lower than the value of the capacitor $C_o$ of the columns. Thus the signal charge quantity $Q_s$ can be transferred to the following capacitor $C_2$ while retaining the charge quantity $Q_o$ and employing a drive charge quantity $Q_1$ having an amplitude which is lower than $Q_o$.

Relation (9) clearly shows that the amplitude of the drive charge is strongly dependent on the value of the source capacitor. Since the capacitor $C_1$ has a value lower than that of the capacitor $C_o$, the drive charge $Q_1$ has a value below that of the drive charge $Q_o$.

Since the transfer which precedes this latter takes place while the MOS transistor $T_2$ is in the saturating mode, the signal $\phi_{E2}$ applied to the gate $G_2$ is at a high level above the high level established by the signal $\phi_{E1}$ beneath the gate $G_1$ as shown in dashed lines in FIG. 4b.

The signal $\phi_{C2}$ applied to the capacitor $C_2$ is also at the high level. The other signals $\phi_{E1}$, $\phi_{C1}$, $\phi_{E3}$, $\phi_{C3}$ . . . are at the low level. It will readily be apparent that this is only one possible operating mode among others and that, in particular, the various control signals employed can be modified. The potential of the diode $d_2$ which is a floating potential is aligned with the potential established by the gate $G_2$, which corresponds to transfer of $Q_1 + Q_S$ to the capacitor $C_2$ as shown in FIG. 4b.

Transfer of the signal charge quantity $Q_S$ is then carried out from capacitor $C_2$ to capacitor $C_3$ while retaining the drive charge quantity $Q_1$ and employing a drive charge quantity $Q_2$. Since the value of capacitance chosen for the capacitor $C_2$ is lower than that of the capacitor $C_1$, it is possible to employ a drive charge $Q_2$ having a value lower than $Q_1$. In accordance with this sequence, the signal charge quantity $Q_S$ is transferred to capacitors of decreasing value by employing drive charges which are also of decreasing value.

Thus, after a variable number of transfers and therefore after utilization of a circuit 5 having a variable number of MOS transistors operating in the saturating mode and of capacitors, the signal charge quantity $Q_S$ is transferred into the read register at the same time as a polarization charge.

In FIG. 3, six transistors $T_1$ to $T_5$ and five capacitors $C_1$ to $C_5$ constitute the circuit 5. A charge quantity equal to $Q_5+Q_S$ is transferred into the read register.

The capacitors $C_1$ to $C_5$ and therefore the polarization charges $Q_o$ to $Q_5$ are of decreasing value. The drive charge quantity $Q_5$ has an amplitude such that this latter can be transferred into the read register 4 without any difficulty at the same time as the signal charge $Q_s$.

The gates $G_1$ to $G_6$ receive control signals $\phi_{E1}$ to $\phi_{E6}$, the high level of which is of increasing amplitude in order to ensure that successive transfers always take place in the same direction and in order to retain the drive charge quantities.

When the signal charge quantity $Q_S$ has been transferred into the read register, the drive charges from $Q_4$ to $Q_1$ are transferred in the opposite direction from the register to capacitor $C_o$ in order to permit transfer of the following signal charge. This step is illustrated in FIG. 4b solely in regard to the return of drive charge $Q_o$ to capacitor $C_o$ but this step begins with the return of drive charge $Q_4$ to capacitor $C_4$ from capacitor $C_5$ followed by the return of $Q_3$ to $C_3$ from $C_4$ and so on in sequence.

The drive charges $Q_5$ are transferred from the register to the capacitors $C_5$ when the signal $\phi_{E6}$ undergoes a transition to the high level immediately before transfer of $Q_5+Q_S$ to the register.

If consideration is given by way of example to the return of drive charge $Q_0$ to capacitor $C_o$, this return takes place when the signal $\phi_{E1}$ applied to the gate $G_1$ is at a high level $V_S(\phi_{E1})$ and while the signal $\phi_{C1}$ applied to capacitor $C_1$ changes to a low level.

The amplitude of the drive charge $Q_o$ is determined by the amplitude $\phi_{C1}$ of the variation in potential of the capacitor $C_1$ between its present low level and its high level at the time of transfer of $(Q_1+Q_S)$ to the capacitor $C_2$ when there is an alignment with the potential $V_S$ established by the gate $G_2$.

We may write:

$$Q_o/(C_1+C_{P1}) = \Delta\phi_{C1} \cdot (C_1/C_1+C_{P1}) - (V_S(\phi_{E2}) - V_S(\phi_{E1}))$$

where $C_{P1}$ is the capacitance of the diode $d_2$ with respect to the substrate at the point B whence:

$$Q_o = \Delta\phi_{C1} \cdot C_1 - (V_S(\phi_{E2}) - V_S(\phi_{E1})) \cdot (C_1+C_{P1}) \quad (11)$$

Similar expressions define the other drive charges with the exception of the drive charge $Q_5$ which is introduced in known manner by the read register.

In order to avoid operation of the read register with unduly high voltages, it is found necessary to limit the amplitude of the potential barriers $\Delta V_S = V_S(\phi_{Ei}) - V_S(\phi_{Ei-1})$, for example between 1.5 and 2.5 V.

It is possible to choose potential barriers $\Delta V_S$ which are of equal value throughout the circuit 5.

In regard to the voltages $\Delta\phi_{C1}, \Delta\phi_{C2} \ldots$, equal values can be chosen in order to simplify the electronic control circuitry.

It has been noted earlier that the drive or polarization charges must satisfy the following relation:

$$\frac{Q_i}{C_i} \geq \phi_F = \frac{kT}{q} \cdot \operatorname{Ln} \frac{N_D}{n_i} = nk\frac{T}{q} \quad (1')$$

Moreover, from relation (11) which is written:

$$Q_i = \Delta\phi_{Ci+1} \cdot C_{i+1} - (V_S(\phi_{Ei+2}) - V_S(\phi_{Ei-1})) \cdot (C_{i+1}+C_{P(i+1)}))$$

it is possible to obtain a simplified expression of $Q_i$ by considering $C_{P(i+1)}$ as negligible in comparison with $C_{i+1}$ and by considering that:

$$\Delta\phi_{C1} = \Delta\phi_{C2} = \ldots = \ldots \Delta\phi_{Ci+1} = \Delta\phi_C \text{ and that} \quad (12)$$

$$V_S(\phi_{Ei+2}) - V_S(\phi_{Ei+1}) = \Delta V_S:$$

$$Q_i \simeq C_{i+1} \cdot (\Delta\phi_C - \Delta V_S)$$

The combination of the two relations (1') and (12) produces the following ratio:

$$\frac{C_i}{C_{i+1}} \leq \frac{\Delta\phi_C - \Delta V_S}{n\frac{kT}{q}} = r \quad (13)$$

With $\Delta\phi_C = 5$ V, $\Delta V_S = 2.5$ V and $r=12$, we obtain:

$$C_i/C_{i+1} \leq r = 8$$

This ratio is retained between two successive capacitors throughout the circuit 5, thus producing the following relation, $$C_N = C_o/r^N$$

where N is the number of capacitors of the circuit 5.

Relation (1') may accordingly be written as follows:

$$\frac{Q_N}{C_N} = \frac{Q_N}{C_o} \cdot r^N \geq \frac{nk \cdot T}{q}$$

so that $r^N \geq \frac{nkT}{q} = \frac{C_o}{Q_N}$ and that $N \geq \dfrac{\operatorname{Ln}\left(\dfrac{nkT}{q} \dfrac{C_o}{Q_N}\right)}{\operatorname{Ln} r}$ Assuming that the following values are adopted: $C_o = 1000$ pF, $Q_N = 1$ pC, where $Q_N$ is the drive charge carried by the register, $r=8$ and $n=12$, the following limit is accordingly obtained in respect of N:

$$N \geq 2.7$$

The value $N=3$ is then chosen and each circuit 5 is accordingly provided with three capacitors $C_1$, $C_2$, $C_3$ having values respectively of 125 pF, 15 pF and 2 pF.

All the charge-transfer devices referred-to above are buried-channel devices in which transfer of charges takes place in volume.

Charge transfer thus takes place in volume within the read register 4 and in the circuits 5 at the level of the MOS transistor gates.

When charge transfer takes place in volume, lateral electric field effects are considerably greater than when transfer of charges takes place at the surface. This results in modulation of the potential barrier which exists beneath each transfer gate, the effect of modulation being to set a limitation on transfer efficiency.

In French patent Application No. 2,551,919 filed on Sept. 13th, 1983 in the name of Thomson-CSF, it is proposed to overcome this disadvantage of modulation of the potential barrier by substituting for each charge transfer gate a first gate which is brought to a direct-current voltage and is followed (depending on the direction of charge transfer) by a second gate for receiving a control signal.

Thus in the case of FIG. 4, each gate $G_1$ to $G_6$ receives a control signal $\phi_{E1}$ to $\phi_{E6}$ and each gate aforesaid is preceded by a gate $G_1$ to $G_6$ which is brought to a direct-current voltage.

The presence of these gates $G_1$ to $G_6$ does not modify the operation of the circuit 5 as explained earlier.

Referring now to FIGS. 5 to 8, the following description will give one example of utilization of the reading circuit described earlier.

The particular case considered by way of example relates to the field of radiology.

There is employed a matrix of photosensitive elements having substantial dimensions such as 40 cm×40 cm, for example, and formed by 1000 rows or so-called lines and 1000 columns of photosensitive elements. This matrix 1 is shown diagrammatically in FIG. 5.

Each photosensitive element is constituted by a photodiode in series with a capacitor. Large-size matrix arrays can thus be obtained since thin-film deposition of materials such as amorphous silicon on a glass substrate is now a well-mastered technique.

Consideration is given to matrix arrays of this type in French patent Application Nos. 86.00656 and 86.00716 filed in January 1986 in the name of Thomson-CSF and not yet published.

FIG. 5 shows that reading circuits 50 in accordance with the invention are employed for reading the matrix array 1 and each comprise a number of circuits 5 such as those illustrated in FIG. 3. In FIG. 5, each reading circuit is thus made up of one hundred circuits 5 and is connected to one hundred conductive columns 3 derived from the matrix 1. The circuits 5 are carried by a ceramic substrate 6 provided with screen-deposited tracks for connecting the circuits to each other.

The capacitance of the connecting leads of the columns 3 thus formed has a very high value of the order of 1000 pF with respect to the capacitances of the order of 1 pF of the detectors and of the read register which is connected to the circuits 5.

In the photosensitive devices which are wholly formed on silicon, the capacitance of the column leads is much lower, namely of the order of 1 pF.

Each reading circuit 50 is therefore connected to a CCD-type read register 4 having two hundred or four hundred stages in order to avoid the use of transfer gates which are of excessive length. The intermediate stages can be employed for storing and reading parasitic charges as will be shown hereinafter. A multiplexer 7 can subsequently be employed for multiplexing the outputs of the read registers 4 in order to ensure that the device of FIG. 5 has only one output S.

In the two Thomson-CSF patents cited in the foregoing, reading of the photosensitive elements is carried out by making use of differential amplifiers mounted as an integrator. The reading circuits in accordance with the invention make it possible to dispense with these amplifiers which are difficult as well as costly to construct.

FIG. 6 is a schematic top view of part of the photosensitive device of FIG. 5.

There are shown in this figure three rows or so-called lines $l_1$, $l_2$, $l_3$ and four columns $c_1$, $c_2$, $c_3$, $c_4$ formed by photosensitive elements. Each element is made up of a capacitor C in series with a photodiode d and connects a line to a column, the cathode of the photodiode being connected to a column. The invention applies in any respective positions of the capacitor and of the photodiodes, regardless of whether the anode or the cathode of the photodiode is connected to a line or to a column. There is shown part of the line-addressing register 2 which delivers control signals $\phi_p$ and part of a reading circuit 50 in accordance with the invention.

Each column lead 3 is connected to a circuit 5 such as the circuit shown in FIGS. 3 and 4. In FIG. 6, the circuits 5 are shown in a top view and include three storage capacitors $C_1$, $C_2$, $C_3$ and four MOS transistors $T_1$ to $T_4$. The MOS transistors $T_4$ transport the charges to a read register 4. The output of each diode d is connected both to a gate $G_4$ and to another gate $\phi_R$ followed by a drain D which receives a bias voltage $V_D$ and is employed for removal of parasitic charges as will be explained hereinafter. There is also shown in FIG. 6 part of a read register 4 which is controlled by two clock signals $\phi_1$, $\phi_2$ and has four stages 8 for each column lead 3 which is connected to the reading circuit 50.

The operation of the device of FIG. 6 will now be explained by describing FIGS. 7a to 7g and FIGS. 8a to 8m.

It must be borne in mind that the method of reading which is employed for reading the device of FIG. 6 has already been partly described in French patent Application No. 86.00656 cited earlier.

One stage of this reading method consists in superimposing a charge background on the useful signal in order to ensure that each photodiode is reliably biased beyond its knee voltage during the read control pulse even when no useful signal is present. In order to produce this superimposition, it is possible as shown in FIG. 8 to carry out in alternate sequence an initialization step with illumination of the entire panel and trial line-by-line reading of the panel, this being followed by a writing step during which the signal to be detected is applied to the entire panel, and then a final or effective line-by-line reading step.

The addressing signals $\phi_p$ supply the polarization charge by virtue of their different amplitudes equal to $\Delta V_{p1}$ for trial reading and to $\Delta V_{p2}$ for effective reading.

FIG. 7a is a view in cross-section through the circuit 5 and the read register 4 of FIG. 6. Of more particular interest here is the operation of the photosensitive element which is connected to the line $l_2$ and to the column $c_2$.

In FIG. 7a, there is shown the physical structure of the photodiode d. By way of example and as illustrated in the figure, this photodiode can be of the "pin" type in which the n region is connected to the column $c_2$ and the n region of which is connected to the capacitor C at a point M.

FIGS. 7b to 7g show the time variation of the potential within the semiconductor substrate such as silicon in which the circuit 5 is formed.

FIGS. 8a to 8m are time-waveform diagrams of the control signals employed

FIGS. 8a to 8m show successively the level-reset flash of the device or so-called RAN flash, the signal $\phi_P$ applied to the line $l_2$ by the register 2, the signal X detected by the photosensitive device by means of a scintillator, the signals $\phi_{E1}$ to $\phi_{E4}$, the signal $\phi_R$, the signals $\phi_{C1}$, $\phi_{C2}$, $\phi_{C3}$, then the signals $\phi_1$ and $\phi_2$ for controlling the read register 4.

A first stage of operation of the device is designated as the initialization stage.

At the instant $t_0$, the signal $\phi_P$ received by the line 1 is at zero volt in the low state. As a result of the previous reading operations, the photodiodes of the matrix are reverse-biased as illustrated in FIG. 7b in the case of the photodiode of the photosensitive element which connects line $l_2$ to column $c_2$. The potential of the capacitor $C_O$ has previously been established by $V_{SE1}$ and the polarization charge $Q_o$ has been returned from $C_1$ to $C_O$. The phase $\phi_{E1}$ to $\phi_{E4}$ and $\phi_R$ are at the low level and the phases $\phi_{C1}$, $\phi_{C2}$ and $\phi_{C3}$ are at the high level.

At the instant $t_1$, the entire photosensitive panel receives a level-reset flash or RAN flash which is represented in FIG. 8a. The object of the flash is to discharge the photodiodes which are excessively reverse-biased.

The level-reset flash introduces a charge quantity $Q_{RAN}$ which produces a variation of potentials in the p region of each photodiode d and in the capacitor $C_O$ of the conductive column 3 which is connected to each photodiode.

In FIG. 7b, it is apparent that the point M receives a charge quantity $+Q_{RAN}$ and its potential increases by the following value $$\Delta V_M = \frac{Q_{RAN}}{C} \cdot \frac{1}{1 + C_D/C_o + C_D/C} \simeq Q_{RAN}/C$$

where $C_D$ is the capacitor which exists between the p region and the n region of each photodiode. This capacitor $C_D$ is shown between dashed lines in FIG. 7a.

The capacitor $C_O$ of the conductive column 3 receives a charge quantity $\Sigma Q_{RAN}$ derived from all the photodiodes which are connected to the same conductive column 3. The potential variation $\Delta V_{CO}$ in the capacitor $C_O$ takes place in the direction opposite to the potential variation $\Delta V_M$ at the point M.

At the instant $t_1$, the signal $\phi_{E1}$, $\phi_{E2}$, $\phi_{E3}$ and $\phi_R$ undergo a transition to the high level, thus permitting removal of the charge quantity $Q_{RAN}$ to the drain D as illustrated on the right-hand side of FIG. 7b.

When the level-reset flash has ended, the drive charge quantities $Q_0$, $Q_1$, $Q_2$ and $Q_3$ are returned to their original capacitors $C_O$, $C_1$, $C_2$. In fact, transfer of the charge quantity $Q_{RAN}$ to the drain is carried out by making use of these drive charge quantities.

The initialization step continues with trial line-by-line reading of the photosensitive matrix.

This reading operation is effected by transition of the signal $\phi_p$ to the high level and successively for each line (row) of the matrix.

At the instant $t_2$, the line $l_2$ receives a signal $\phi_p$ at the high level. The photodiodes of this line $l_2$ are forward biased. Only the "trial read" of the line $l_2$ is shown in FIGS. 8a to 8m. Between the instants $t_2$ and $t_3$, the line $l_2$ receives a pulse having an amplitude $V_{P1}$. It is apparent from FIG. 7c that a charge quantity $Q_{OD}$ is transferred from the capacitor $C_O$ to the point M during the time interval $T_i = t_3 - t_2$. The voltage at the terminals of the photodiodes of the line $l_2$ becomes equal to the knee voltage of the photodiodes $V_c$.

The instant $t_4$ marks the beginning of transfer to the read register of charge quantities which correspond to reading of the photosensitive elements of line $l_2$. There is thus read a signal corresponding to the dark-current signal of each photodiode of the line $l_2$. Transfer of these charge quantities is carried out by successively superimposing thereon the drive charges $Q_O$, $Q_1$, $Q_2$, $Q_3$.

In FIGS. 8a to 8m, there is indicated the beginning of transfer of these charges to the read register by transition of the signal $\phi_{E1}$ to the high level at the instant $t_4$ during a time interval $T_1$. The signal $\phi_{E1}$ returns to the low level and the signal $\phi_{E2}$ then changes to the high level during a time interval $T_2$ followed by the signal $\phi_{E3}$ during a time interval $T_3$ and the signal $\phi_{E4}$ during a time interval $T_4$. Once the charges have been entered in the read register, the clock signals $\phi_1$ and $\phi_2$ of the register shift to the high level in alternate sequence so as to transfer the charges to the output of the register. The drive charges $Q_0$, $Q_1$, $Q_2$ are then returned to their initial capacitor by transition of signal $\phi_{C3}$ to the low level followed by signal $\phi_{C2}$, then by signal $\phi_{C1}$ and transition of signals $\phi_{E3}$, $\phi_{E2}$, $\phi_{E1}$ to the high level.

The drive charge $Q_3$ is returned from the register to the capacitor $C_3$ at the start of the time interval $T_4$ whilst the signal $\phi_{E4}$ is at the high level and the signal $\phi_1$ is still at the low level.

Once a "trial read" of line $l_2$ has been completed, this is followed by trial reading of line $l_3$, then of all the lines of the panel in sequence.

The output signal of the read register corresponding to the dark-current signal of the photodiodes of each line of the panel can be stored in memory in order to make a subsequent correction during the reading stage.

When trial reading of each panel line has been completed, the signal $\phi_p$ returns to zero in respect of all the lines of the panel. All the photodiodes of the panel are again reverse-biased but with a lower value than at the instant $t_0$ since the amplitude $V_{p1}$ of the signal $\phi_p$ during the initialization stage is smaller than its amplitude $V_{p2}$ during the reading stage. In the case of the line $l_2$, the signal $\phi_p$ returns to zero from the instant $t_3$ as illustrated in FIG. 7d.

The panel writing stage begins at the instant $t_5$. The signal to be detected (x-radiation in the example under consideration) is sent simultaneously to the entire panel by means of a scintillator.

The variation in potential at the point M is substantially equal to $Q_{Sj}/C$ and the variation in potential in the capacitor $C_0$ is substantially equal to $\Sigma Q_{Sj}/C_0$ by analogy with the previous changes of state which occurred at the instant $t_1$ when the level-reset pulse was applied. This variation in potential is shown in FIG. 7d.

The signal X is applied between the instants $t_5$ and $t_6$. Between these instants, the signals $\phi_{E1}$, $\phi_{E2}$, $\phi_{E3}$ and $\phi_R$ are at the high level. The charges thus flow directly from the capacitor $C_O$ towards the charge removal drain D.

The drive charges are returned to their initial capacitors from the instant $t_7$ by successive transitions of the signal $\phi_{C3}$, $\phi_{C2}$, $\phi_{C1}$ to the low level and successive transitions of the signals $\phi_{E3}$; $\phi_{E2}$, $\phi_{E1}$ to the high level as illustrated in FIG. 7e in regard to the return of charges $Q_1$ and $Q_O$.

The writing step is then completed. The following step consists in line-by-line reading of the entire panel.

Reading of each line of the panel may involve the following three sequences:

possible reading of parasitic charges consisting of residual charges which arise from reading of the previous line;

transfer of signal charges from each photosensitive element to a conductive column;

final reading of the signal charges.

In FIGS. 8a to 8m, only the reading of line $l_2$ is shown.

Starting from the instant $t_8$, reading of the parasitic charges $Q_p$ consisting of residual charges arising from reading of the previous line then begins The control signals $\phi_{E1}$, $\phi_{E2}$, $\phi_{E3}$ and $\phi_{E4}$ undergo successive transitions to the high level. The drive charge quantity $Q_3$ is transferred from the register to the capacitor $C_3$, whereupon the signal $\phi_1$ in turn changes to the high level and a transfer of $Q_p + Q_3$ into the register then takes place.

The control signals of the register $\phi_1$ and $\phi_2$ shift once to the high level as shown in FIGS. 8l and 8m. The parasitic charges are then stored in the intermediate stages of the register.

The drive charges $Q_O$, $Q_1$, $Q_2$ are returned to their initial capacitors. There then begins at the instant $t_9$ the transfer of the signal charges from the photosensitive elements of line $l_2$ to the conductive columns.

At the instant $t_9$, the line $l_2$ receives a signal $\phi_p$ having an amplitude equal to $\Delta V_{p2}$. The photodiodes of this line are forward-biased. The diagram of FIG. 7f shows that each photodiode draws a quantity of charge equal to $Q_{OD} + Q_S$ from its conductive column so as to be restored to its knee voltage $V_c$ at the instant $t_{10}$ when the signal $\phi_p$ reverts to zero. The polarization charge $Q_o$ is thus reduced by the value $Q_{OD} + Q_S$ as shown in FIG. 7g. This charge quantity $Q_{OD} + Q_S$ is then subtracted from $Q_1$, then from $Q_2$ and $Q_3$ at the time of transfer to the read register. The clock signals $\phi_1$ and $\phi_2$ of the register transfer the information at the output of the register. The drive charges $Q_o$, $Q_1$, $Q_2$ are returned to their initial capacitors.

Among the alternative embodiments of the invention may be mentioned the possibility of employing a photosensitive matrix consisting of a plurality of modules placed in end-to-end relation. This possibility has been described in French patent Application No. 86.06334 filed by THOMSON-CSF on Apr. 30th, 1986 and not yet published. Each module includes an array of photosensitive detectors having the same number of columns as the matrix but having a smaller number of lines. Arrangements can be made to provide each module with its own line-addressing means located on one edge of the substrate on the same side as the detectors and with its own reading means located on the other side of the substrate with respect to the detectors, a screen which is opaque to the radiation to be detected being interposed between the substrate and said reading means and these latter being connected to the column leads which extend from the opposite side of the substrate by means of leads located on one of the lateral faces of said substrate.

The use of modules 2 joined together in end-to-end relation in order to form the photosensitive matrix permits a reduction in value of capacitance of the columns.

A further alternative embodiment of the invention consists in making use of negative-feedback amplifiers located in the example of FIG. 6 between the column leads 3 and the gate $G_1$. The input of each amplifier is connected to a column lead and the output of each amplifier is connected to a gate $G_1$. The use of negative-feedback amplifiers has been described in French patent Application No. 2,571,572 filed in the name of Thomson-CSF on Oct. 9th, 1984.

What is claimed is:

1. A line-transfer photosensitive device having a reading circuit, and a photosensitive zone made up of photosensitive elements arranged in rows and columns, the photosensitive elements of any one column being connected to a conductive column which terminates at said reading circuit, signal charges being produced by said photosensitive elements and being applied to the conductive column, said reading circuit being provided with at least one charge-coupled shift register, the capacitance of the conductive columns being of high value with respect to the capacitance of the photosensitive elements and of said register, wherein said reading circuit is provided in the case of each conductive column with a plurality of charge storage capacitors which forms a succession of capacitors, each two successive storage capacitors being separated by a respective one of a plurality of MOS transistors which operates in the saturating mode and ensures transfer of the signal charges from one capacitor to the next up to said register, the storage capacitors being of decreasing value as the distance from said register decreases, wherein said reading circuit is also provided with means for generating quantities of polarization charges which accompany the transfer of signal charges from a conductive column to a storage capacitor and then the transfer of said signal charge from one storage capacitor to the next up to said register, the quantities of polarization charges being of decreasing value as the distance from said register decreases and wherein said reading circuit is also provided with means for returning the quantities of polarization charges from a storage capacitor or from said register to the preceding capacitor.

2. A device according to claim 1, wherein said reading circuit includes a charge-coupled shift register, charge storage capacitors and MOS transistors which are constituted by buried-channel charge-coupled devices.

3. A device according to claim 2, wherein each MOS transistor has a charge-transfer gate constituted by a first gate for receiving a direct-current voltage and a second gate for receiving a pulsed control signal.

4. A device according to claim 1, wherein the one of said MOS transistors which is nearest said register has a gate for passing the charges to said register and another gate for passing the charges to an evacuation drain.

5. A device according to claim 1, wherein said device is constituted by a plurality of modules placed in end-to-end relation.

6. A device according to claim 1, wherein said device includes negative-feedback amplifiers having an input connected to one column lead and an output connected to a gate forming part of a first one of said MOS transistors of said reading circuit.

7. A device according to claim 1, wherein each photosensitive element is constituted by a photodiode in series with a capacitor.

8. A device according to claim 7, wherein each photodiode is of the pin type.

9. A method for reading a line-transfer photosensitive device having a photosensitive zone made up of photosensitive elements arranged in rows and columns, the photosensitive elements of any one column being connected to a conductive column which terminates at said reading circuit, signal charges being produced by said photosensitive elements and being applied to the conductive column, said reading circuit being provided with at least one charge-coupled shift register, the capacitance of the conductive columns being of high value with respect to the capacitance of the photosensitive elements and of said register, wherein said reading circuit is provided in the case of each conductive column with a plurality of charge storage capacitors which forms a succession of capacitors, each two successive storage capacitors being separated by a respective one of plurality of MOS transistors which operates in the saturating mode and ensures transfer of the signal charges from one capacitor to the next up to said register, the storage capacitors being of decreasing value as the distance from said register decreases, wherein said reading circuit is also provided with means for generating quantities of polarization charges which accompany the transfer of signal charges from a conductive column to a storage capacitor and then the transfer of said signal charge from one storage capacitor to the next up to said register, the quantities of polarization charges being of decreasing value as the distance from said register decreases and wherein said reading circuit is also provided with means for returning the quantities of polarization charges from a storage capacitor or from said register to the preceding capacitor, wherein said method involves the following steps:

(a) an initialization step during which the entire photosensitive zone receives an intense light flash for discharging the photodiodes which are excessively reverse-biased while at the same time removing charges to the drain, whereupon line-by-line reading of the photosensitive zone is carried out by successively forward-biasing the photodiodes of each line of the photosensitive zone by making use of voltage pulses having an amplitude $\Delta V_{p1}$;

(b) a writing step during which the signal to be detected is sent over the entire photosensitive zone while at the same time removing charges to the drain;

(c) a step involving line-by-line reading of the photosensitive zone and, in the case of each line:

transfer of the signal charges derived from the photosensitive elements to the conductive columns by forward-biasing photodiodes and employing a voltage pulse having an amplitude $V_{p2}$ which is higher than the amplitude $\Delta V_{p1}$ of the pulses employed during step a;

reading of the signal charges with transfer of said signal charges into the register, all transfers of charges to the register or to the drain being accompanied by drive charges which are subsequently returned to their initial capacitors.

10. A method according to claim 9 wherein, during step a, the charge quantities which correspond to reading of the photosensitive elements of said line are transferred to said register and wherein these data corresponding to the dark-current signal of the photodiodes of each line of the photosensitive zone are stored in memory so as to make a subsequent correction during step c.

11. A method according to claim 9 wherein, during step c, reading of each line begins with reading of the parasitic charges constituted by the residual charges which result from reading of the previous line and with transfer of said charges into said register.

* * * * *